US010606381B2

(12) United States Patent
Kato

(10) Patent No.: US 10,606,381 B2
(45) Date of Patent: Mar. 31, 2020

(54) DISPLAY SYSTEM, INPUT DEVICE, DISPLAY DEVICE, AND DISPLAY METHOD

(71) Applicant: NEC Display Solutions, Ltd., Tokyo (JP)

(72) Inventor: Hiroshi Kato, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 226 days.

(21) Appl. No.: 15/517,138

(22) PCT Filed: Oct. 10, 2014

(86) PCT No.: PCT/JP2014/077163
§ 371 (c)(1),
(2) Date: Apr. 5, 2017

(87) PCT Pub. No.: WO2016/056116
PCT Pub. Date: Apr. 14, 2016

(65) Prior Publication Data
US 2017/0308184 A1    Oct. 26, 2017

(51) Int. Cl.
*G06F 3/038*    (2013.01)
*G06F 3/0488*    (2013.01)
(Continued)

(52) U.S. Cl.
CPC .......... *G06F 3/0383* (2013.01); *G06F 3/033* (2013.01); *G06F 3/041* (2013.01); *G06F 3/0425* (2013.01);
(Continued)

(58) Field of Classification Search
CPC .... G06F 3/033; G06F 3/03545; G06F 3/0383; G06F 3/0386; G06F 3/041; G06F 3/042;
(Continued)

(56) References Cited

U.S. PATENT DOCUMENTS 4,813,000 A * 3/1989 Wyman ................. G01J 3/46
356/402
6,804,406 B1 * 10/2004 Chen ................. G06T 3/4038
345/1.3
(Continued)

FOREIGN PATENT DOCUMENTS

CN    1622131 A    6/2005
CN    101315586 A    12/2008
(Continued)

OTHER PUBLICATIONS

International Search Report (ISR) (PCT Form PCT/ISA/210), in PCT/JP2014/077163, dated Nov. 25, 2014.
(Continued)

*Primary Examiner* — Jason M Mandeville
(74) *Attorney, Agent, or Firm* — McGinn IP Law Group, PLLC

(57) ABSTRACT

A display system includes a display device and an input device. The display device includes a display for displaying images, an image signal processor for displaying images on the display, and a receiver for receiving signals from the input device. The input device includes a detector that detects a target color at a partial area of the display so as to acquire target color information, a storage unit for storing registered color information, a color determination processor that carries out a color determination process for determining whether or not the target color information matches the registered color information so as to generate a color determination signal, and a transmitter for transmitting the color determination signal. The image signal processor carries out a color change process of sequentially changing target colors but suspends the color change process when the receiver receives the color determination signal.

14 Claims, 13 Drawing Sheets

(51) Int. Cl.
*G06F 3/041* (2006.01)
*G06F 3/0484* (2013.01)
*G06F 3/033* (2013.01)
*G06F 3/042* (2006.01)
*G06F 3/0354* (2013.01)

(52) U.S. Cl.
CPC ...... G06F 3/04847 (2013.01); G06F 3/04883 (2013.01); *G06F 3/0386* (2013.01); *G06F 3/03545* (2013.01); *G06F 2203/04104* (2013.01)

(58) Field of Classification Search
CPC .. G06F 3/0425; G06F 3/0484; G06F 3/04847; G06F 3/04883; G06F 2203/04104
USPC .................................................. 345/173, 179
See application file for complete search history.

(56) References Cited

U.S. PATENT DOCUMENTS

| | | | | |
|---|---|---|---|---|
| 9,760,187 | B2* | 9/2017 | Havilio | G06F 3/03545 |
| 2005/0231488 | A1* | 10/2005 | Chou | G06F 3/03545 |
| | | | | 345/179 |
| 2009/0135149 | A1* | 5/2009 | Taniuchi | G06F 3/03545 |
| | | | | 345/173 |
| 2010/0053338 | A1* | 3/2010 | Ko | H04N 9/3182 |
| | | | | 348/184 |
| 2011/0007037 | A1* | 1/2011 | Ogawa | G06F 3/03545 |
| | | | | 345/179 |
| 2013/0033462 | A1* | 2/2013 | Xu | G06F 3/03545 |
| | | | | 345/179 |
| 2013/0212535 | A1* | 8/2013 | Kim | G06F 3/0482 |
| | | | | 715/841 |
| 2014/0035843 | A1* | 2/2014 | Zo | G06F 3/0416 |
| | | | | 345/173 |
| 2014/0168173 | A1* | 6/2014 | Idzik | G06F 3/0304 |
| | | | | 345/179 |
| 2016/0034052 | A1* | 2/2016 | Shu | G06F 3/03545 |
| | | | | 345/179 |
| 2016/0048221 | A1* | 2/2016 | Boulanger | G06F 3/0321 |
| | | | | 345/594 |
| 2016/0154578 | A1* | 6/2016 | Luo | G06F 3/01 |
| | | | | 715/765 |
| 2016/0189592 | A1* | 6/2016 | Kato | G09G 3/2003 |
| | | | | 345/593 |

FOREIGN PATENT DOCUMENTS

| | | |
|---|---|---|
| CN | 101661372 A | 3/2010 |
| CN | 101833662 A | 9/2010 |
| CN | 102165412 A | 8/2011 |
| JP | H 07-141104 A | 6/1995 |
| JP | 2001-067183 A | 3/2001 |
| JP | 2003-512689 A | 4/2003 |
| JP | 2013-250805 A | 12/2013 |
| JP | 2013250805 A * | 12/2013 |

OTHER PUBLICATIONS

Chinese Office Action, dated Jan. 28, 2019, in Chinese Application No. 201480082513.X and English Translation thereof.

* cited by examiner

DISPLAY SYSTEM, INPUT DEVICE, DISPLAY DEVICE, AND DISPLAY METHOD

TECHNICAL FIELD

The present invention relates to a display system, an input device, a display device, and a display method.

BACKGROUND ART

Recently, touch panels combining display devices and position detection devices have been widely spread and used for large apparatuses such as electronic blackboards. For example, many systems for detecting positional inputs such as resistance film types, surface capacitance types, and projection capacitance types have been invented for position detection devices such as touch panels. For example, engineers have developed electronic blackboards using a plurality of color image sensors that can detect color information in addition to positional inputs so as to display colored images rendered by users (e.g. Patent Literature 1).

CITATION LIST

Patent Literature

Patent Literature 1: Japanese Patent Application Publication No. 2001-67183

SUMMARY OF INVENTION

Technical Problem

However, the foregoing technologies cannot provide a correlation between color information and each of positional inputs that are applied to multiple areas concurrently. When multiple persons concurrently depict images having different colors with an electronic blackboard, for example, it is necessary to correlate their input color information to their input position information. However, the foregoing technologies have not assumed the above situation; hence, those technologies cannot correlate color information to each of positional inputs. Therefore, it is likely that foregoing technologies cannot improve color input operations.

The present invention is made to address the problem, and therefore the present invention aims to provide a display system, an input device, a display device, and a display method.

Solution to Problem (1) The present invention is made to solve the above problem, wherein one aspect of the present invention is directed to a display system including a display device and a first input device. The display device includes a display configured to display an image, an image signal processor configured to display the image on the display, and a receiver configured to receive a signal from the first input device. The first input device includes a first detector that detects a first target color representing a color of a first area displayed on the display so as to acquire first target color information representing color information of the first target color, a first storage unit configured to store first registered color information, a first color determination processor that carries out a first color determination process to determine whether or not the first target color information matches the first registered color information so as to generate a first color determination signal when the first target color information matches the first registered color information, and a first transmitter configured to transmit the first color determination signal. The image signal processor carries out a first color change process of sequentially changing the first target color but suspends the first color change process when the receiver receives the first color determination signal.

(2) Another aspect of the present invention is directed to a display device including a display configured to display an image, an image signal processor configured to display the image on the display, and a receiver configured to receive a signal from an input device. The image signal processor carries out a color change process of sequentially changing colors at a partial area of the display but suspends the color change process when the receiver receives a signal, representing suspension of the color change process, from the input device.

(3) A further aspect of the present invention is directed to an input device including a detector that detects a target color representing a color at a partial area of a display installed in a display device so as to acquire target color information representing color information of the target color, a storage unit configured to store registered color information, a color determination processor that carries out a color determination process to determine whether or not the target color information matches the registered color information so as to generate a color determination signal when the target color information matches the registered color information, and a transmitter configured to transmit the color determination signal to the display device.

(4) A furthermore aspect of the present invention is directed to a display method adapted to a display system including a display device having a display to display an image and a first input device having a first storage unit configured to store first registered color information. The display method includes a first step that the display device carries out a first color change process of sequentially changing a first target color representing a color at a first area of the display, a second step that the first input device detects the first target color so as to acquire first target color information representing color information of the first target color, a third step that the first input device carries out a first color determination process to determine whether or not the first target color information matches the first registered color information so as to generate a first color determination signal when the first target color information matches the first registered color information, a fourth step that the first input device transmits the first color determination signal, a fifth step that the display device suspends the first color change process when receiving the first color determination signal, and a sixth step that the display device displays on the display an image having a color corresponding to the first target color when suspending the first color change process in the fifth step.

Advantageous Effects of Invention

According to the present invention, it is possible to improve color input operations.

DESCRIPTION OF EMBODIMENTS

First Embodiment

Hereinafter, the first embodiment of the present invention will be described with reference to the drawings.

First, the outline of a display system 1 according to the first embodiment will be described with reference to FIGS. 1 to 3.

Figure 1:
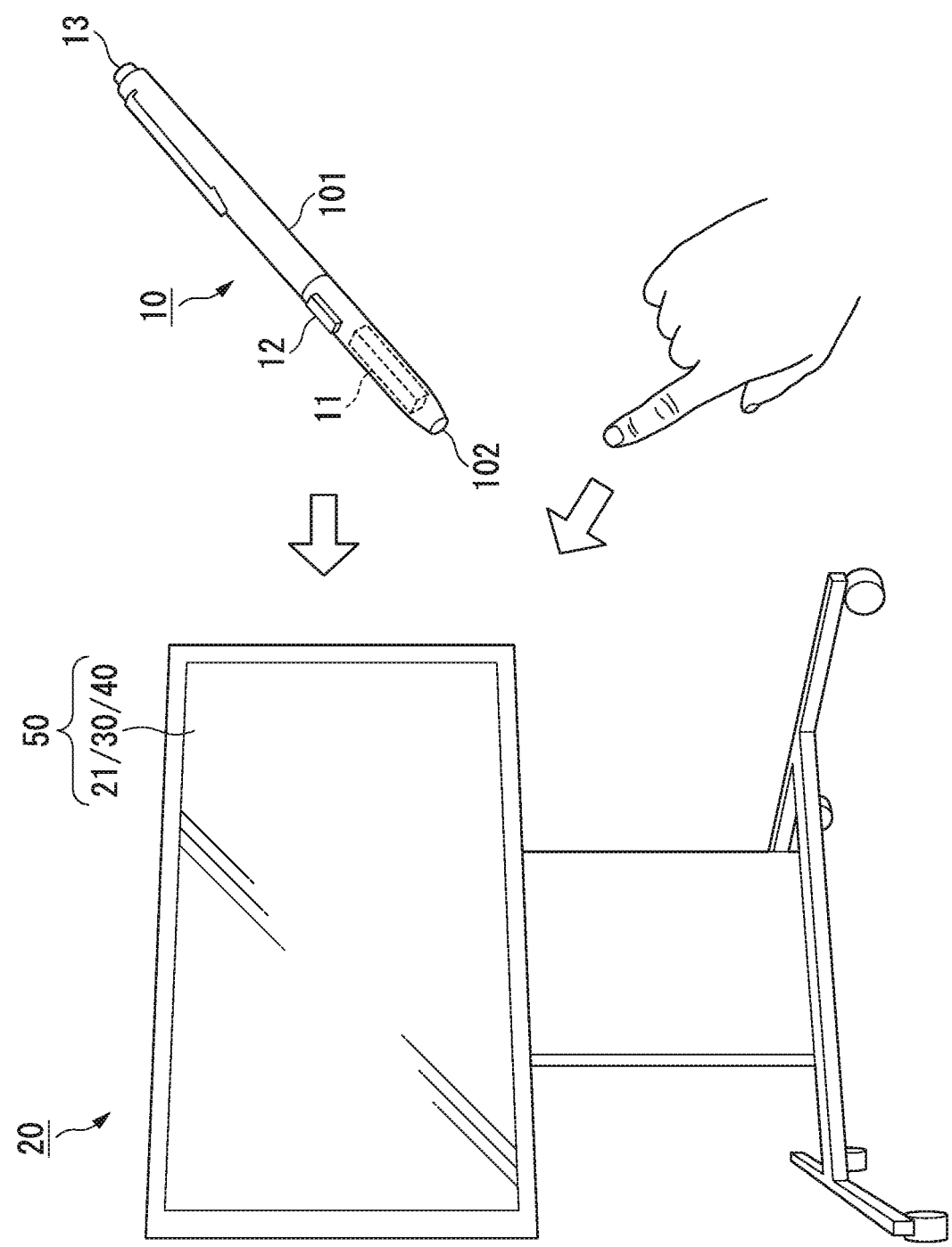
FIG. 1 is a schematic view showing the diagrammatical configuration of a display system according to the first embodiment of the present invention.

FIG. 1 is a schematic view showing the diagrammatical configuration of the display system 1.

The display system 1 includes an input device 10, a display device 20 having a display 21, an information processing device 30, and a position detection device 40. The position detection device 40 is laminated and attached to the surface of the display 21 installed in the display device 20; hence, the display 21, the information processing device 30, and the position detection device 40 are combined together to form a so-called touch panel 50. The touch panel 50 is able to change the rendition of display pixels corresponding to a contact position being touched by a user's finger or the input device 10, thus displaying user's handwritten inputs and input results. Hereinafter, the operation of the display device 20 to display a hand-written image will be referred to as "rendering".

In this connection, the "touch" indicates that a user's finger or the input device 10 touches, contacts, or approaches the touch panel 50. That is, the "touch" does not necessarily suffice the "contact", and therefore a user's finger or the input device 10 may be distanced from the touch panel 50 within a predetermined range of distance.

The input device 10 includes a pen-type casing 101. A hole 102 is formed at the distal end of the pen-type casing 101. A detector (or a color sensor) able to detect the color of an object contacting the distal end of the pen-type casing 101 is installed in the casing 101 of the input device 10. The detector 11 detects a beam of light, which is emitted from an object and input into the hole 102, so as to detect the color of an object. The input device 10 includes a switch 12 and an indicator 13. For example, the switch 12 is a physical button projected from the casing 101, which achieves a function of starting a color registration process, discussed later, with the input device 10 when pressed. For example, the indicator 13 is a light-emitting member such as an LED (Light Emitting Diode) that notifies a user of commencement and completion of processes carried out by the input device 10 by way of lighting-up, flashing, or the like. Herein, the indicator 13 exemplifies a notification member for notifying a user operating the input device 10 of any information by way of display, sound, and vibration. In addition, the input device 10 has a communication device (or a communication part of the input device) 14, which is able to communicate with the display device 20 by wire or by radio.

For example, the display device 20 is an electronic device serving as an electronic blackboard and an interactive whiteboard. The display device 20 displays images based on image signals output from the information processing device 30.

The position detection device 40 detects a contact on the surface of the touch panel 50 being touched by a user so as to generate position information representing coordinates of a touched area. Hereinafter, the "touched area" refers to an area detecting a touch on the touch panel 50 or part of area of the display 21 corresponding to a touch. That is, the touched area indicates pixels of the display 21 corresponding to the touched position. In this connection, the touched area may have a certain expanse of area with respect to the position information actually detecting a touch. Specifically, when a user carries out a hand-written input using a thick line, the touched area may include other pixels proximate to pixels corresponding to position information depending on the thickness of each line. In addition, the touched area may include the previously touched area for each frame of processing.

The information processing device 30 generates image signals based on the position information generated by the position detection device 40.

Next, the outline operation of the display system 1 will be described.

For the sake of rendering, a user moves the input device 10 so as to touch the display device 20 with its pen point. Next, upon detecting a touch on the touch panel 50 being touched by the input device 10, the display device 20 carries out a process of sequentially changing colors on the touched area. Hereinafter, the color of the touched area will be referred to as "a target color" as necessary. In addition, this process will be referred to as "a color change process". On the other hand, the input device 10 carries out a color determination process. According to the color determination process, the detector 11 of the input device 10 sequentially detects colors of areas being touched with its pen point, i.e. target colors, so as to acquire target color information representing color information of target colors. The color information indicates information concerning colors. For example, the color information is the information for specifying the changed color(s) in the process of sequentially changing colors of touched areas. For example, the color information may represent detection values produced by detector 11 detecting colors. Next, the input device 10 sequentially compare the target color information detected by the detector 11 with the registered color information stored in a storage unit 15 so as to determine whether or not the target color information matches the registered color information. For example, the registered color information indicates the color information representing colors registered in the storage unit 15 according to the color registration process discussed later. Next, the input device 10 transmits a color determination signal to the display device 20 based on the determination result. Specifically, upon receiving a color determination signal, the display device 20 controls the color change process based on the color determination signal so as to determine the color of a touched area.

For example, the color determination signal is a signal used to suspend the color change process by the display device 20. In this case, the display device 20 changes the color of a touched area by predetermined time intervals in the color change process until receiving the color determination signal. Then, the display device 20 determines the color being displayed when receiving the color determination signal as the color of a touched area. For example, the color determination signal may be a signal for proceeding to the color change process. In this case, the display device 20 changes the color of a touched area according to the color change process when receiving the color determination signal. When the display device 20 cannot receive a color determination signal for the predetermined time or more, the display device 20 determines the currently displayed color as the color of a touched area.

Hereinafter, the following description refers to an example of a color determination signal serving as a signal for suspending a color change process (hereinafter, referred to as a "color change suspension instruction").

Next, the color registration process of the input device 10 will be described with reference to FIG. 2.

Figure 2:
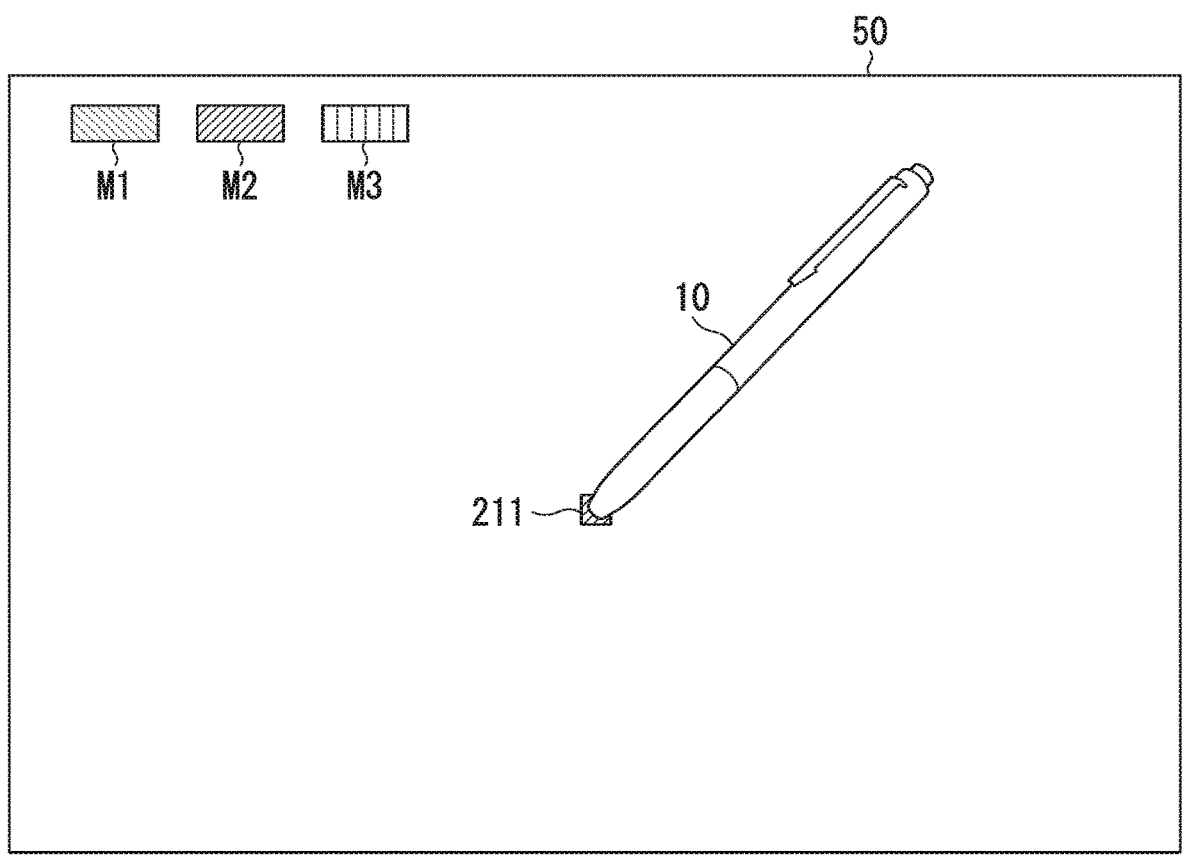
FIG. 2 is a drawing used to explain the outline operation of the display system according to the first embodiment of the present invention.

FIG. 2 is a drawing used to explain the outline operation of the display system 1.

In the example of FIG. 2, the touch panel 50 displays color markers M1 through M3. The color markers M1 through M3 are markers showing different colors, which indicate colors that can be inputted using the input device 10. The colors represented by color markers can be arbitrarily selected by each user. In FIGS. 2, 3, 10, and 11, hatching areas show their colors. Hereinafter, the following description refers to an example of color markers M1 through M3 representing red, blue, and green. It is possible to carry out rendering using the colors of color markers M1 through M3 when the input device 10 registers the colors of color markers M1 through M3 therein by itself. Hereinafter, the process of the input device 10 registering colors for specifying colors in rendering will be referred to as "a color registration process".

An example of the color registration process will be described below. A user moves the pen point of the input device 10 to touch any one of the color markers M1 through M3, and then the user presses the switch 12. When the switch is pressed by a user, the input device 10 stores the color information, concerning the color detected by the detector 11, on the storage unit 15, thus registering the color of a color marker being touched. Upon completion of registration, the input device 10 turns on the indicator 13 so as to notify a user of the completion of the color registration process.

Next, the outline of the color change process by the display device 20 will be described with reference to FIGS. 2 and 3.

In an example of FIG. 2, the input device 10 already touched an area 211 of the touch panel 50 with the pen point thereof. Upon detecting a touch on the touch panel 50, the display device 20 carries out the color change process for sequentially changing colors in the touched area 211.

The color change process will be described. First, upon detecting a touch on the touch panel 50, the display device 20 starts the color change process. Next, the display device 20 displayed a trigger on the touched area. Then, the display device 20 changes the colors registerable with the input device 10 in the predetermined order.

In this connection, the trigger servers as a trigger to start the color determination process, discussed later, with the input device 10. For example, the trigger indicates an operation of displaying the predetermined color. Alternatively, the trigger indicates an operation of changing multiple colors in the predetermined order. Hereinafter, the following description refers to an example of a trigger for displaying a white color subsequent to a black color.

Figure 3:
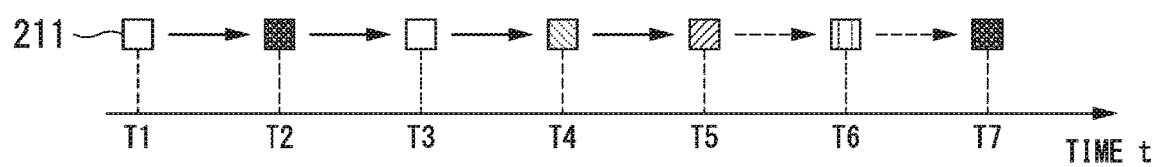
FIG. 3 is a drawing used to explain the outline of a color change process according to the first embodiment of the present invention.

FIG. 3 is a graph showing gradual variations of colors on the area 211, shown in FIG. 2, with respect to time. In the example of FIG. 3, the horizontal axis represents time t indicating time progression among times T1 through T7. That is, the display device 20 sequentially changes the color of the touched area 211 in correspondence with the colors assigned to times T1 through T7. Specifically, the display device 20 changes the color of the touched area 211 in an order of colors, such as white, black, white, red, blue, green, and black, at times T1 through T7 unless it receives a color change suspension instruction from the input device 10. In this connection, it is possible for the user or the manufacturer of the display device 20 to arbitrary change the order of colors displayed on screen according to the color change process. In addition, the color change process does not necessarily set the time length of displaying each color to a fixed value. For example, the display device 20 may set a longer time length to the trigger color compared to other colors.

In FIG. 3, time T1 indicates the timing before detecting a touch on the touch panel 50. In addition, time T2 indicates the timing just after detecting a touch on the touch panel 50. That is, the display device 20 detects a touch on the touch panel 50 during a period between times T1 and T2 so as to start the color change process. At first, the display device 20 displays a trigger using black and white on screen in a period between times T2 and T3, thus causing the input device 10 to start the color determination process. Thereafter, the display device 20 sequentially changes colors until it receives a color change suspension instruction. Upon receiving a color change suspension instruction in a period between times T5 and T6, for example, the display device 20 suspends changing the color of the touched area 211 so as to determine the blue color currently displayed on screen. If the display device 20 fails to receive a color change suspension instruction, the display device 20 determines the predetermined color such as the black color for the color of the touched area 211 after completing a sequence of changing colors. Thus, when the user touches the screen with his/her finger without using the input device 10, for example, the display device 20 is able to render an image using the predetermined color.

Next, various types of devices configurations included in the display system 1 will be described with reference to FIG. 4.

Figure 4:
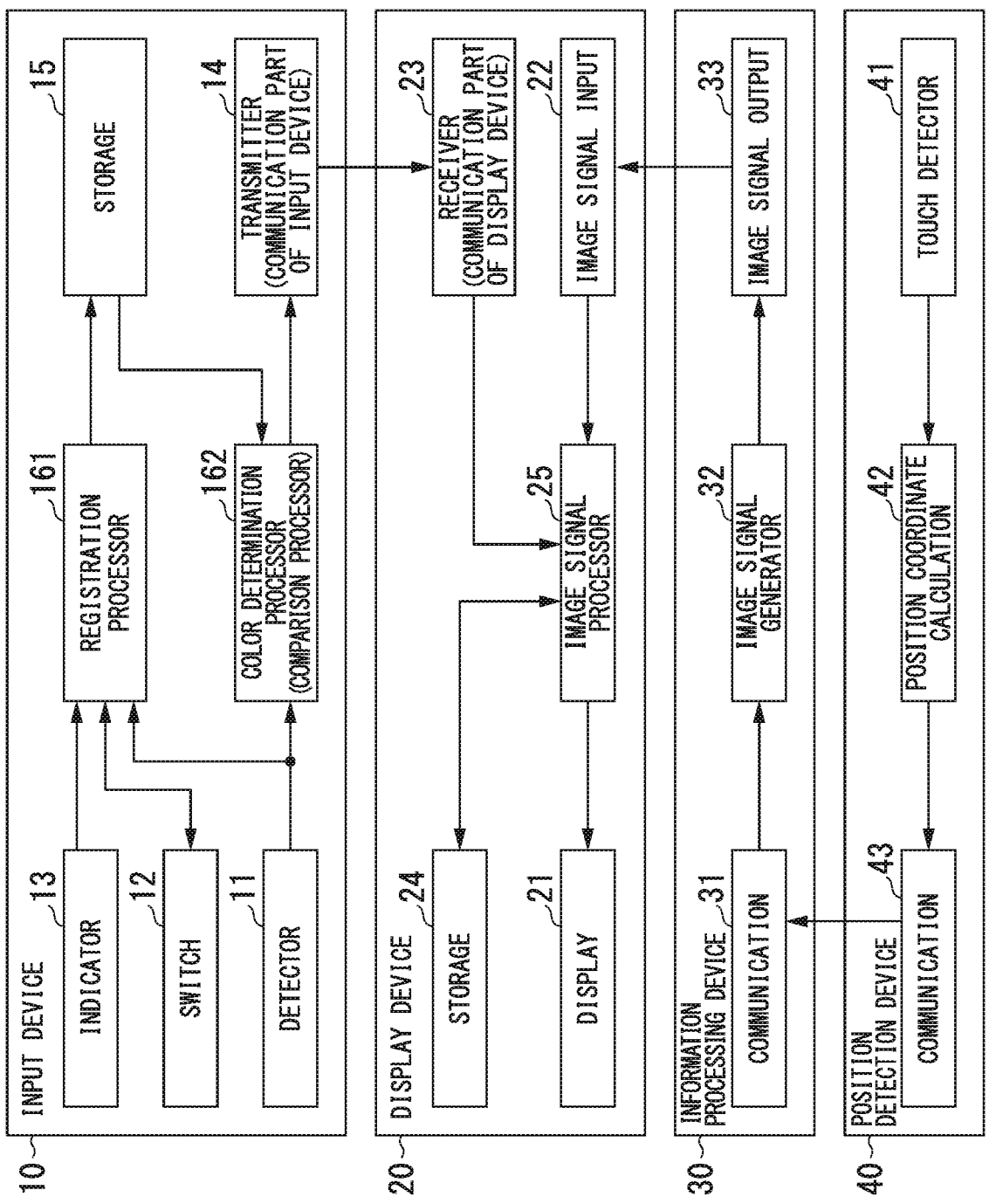
FIG. 4 is a block diagram showing the diagrammatical functional configuration of the display system according to the first embodiment of the present invention.

FIG. 4 is a block diagram approximately showing the functional configurations with respect to the input device 10, the display device 20, and their peripheral devices.

First, the configuration of the input device 10 will be described below.

The input device 10 includes a detector 11, a switch 12, an indicator 13, a transmitter (i.e. a communication part of the input device) 14, a storage unit 15, a registration processor 161, and a color determination processor (i.e. a comparison processor) 162. For example, the registration processor 161 and the color determination processor 162 are realized using a microcontroller (not shown) installed in the input device 10.

The detector 11 includes a color sensor to detect color information. The detector 11 sends the detected color information to the registration processor 161 and the color determination processor 162.

The switch 12 sends a signal corresponding to pressing thereof to the registration processor 161.

The indicator 13 carries out lighting-up, flashing, and light-out in response to a request by the registration processor 161. The present embodiment refers to an example of the indicator 13 that indicates the commencement of the color registration process by way of lighting-up but that indicates a failure of the color registration process by way of flashing.

The transmitter 14 having a communication interface transmits signals to the display device 20.

The storage unit 15 includes ROM (Read Only Memory), RAM (Random Access Memory), or the like. Alternatively, the storage unit 15 may include EEPROM (Electrically Erasable Programmable Read Only Memory), flash memory, or the like. The storage unit 15 stores various pieces of information used for processing of a microcontroller (or a microprocessor) installed in the input device 10 as well as processing results.

The storage unit 15 stores color information. The color information represents the information concerning colors, e.g. color numbers representing colors such as six-digit numbers in hexadecimal notation. For example, color numbers may be numbers representing a smaller number of hues arbitrarily determined such as 256 colors and eight colors. Herein, the color information represent color numbers. In addition, the storage unit 15 stores trigger color numbers. In other words, the storage unit 15 stores trigger information representing trigger colors.

The registration processor 161 carries out a color registration process. In the color registration process, upon receiving a signal corresponding to the pressing of the switch 12, the registration processor 161 sends a lighting-up instruction to the indicator 13. For example, the registration processor 161 receives color numbers outputted from the detector 11 for a predetermined time, thus determining the color number subjected to registration. At this time, the registration processor 161 may carry out an arbitrary process for improving the precision of registering the color number based on the output value of the detector 11. The registration processor 161 achieves the color registration by storing the determined color number on the storage unit 15. Upon storing the color number on the storage unit 15, the registration processor 161 sends a lighting-out instruction to the indicator 13. In addition, the registration processor 161 sends a lighting-out instruction to the indicator 13 when the registration processor 161 fails to determine the color number to be registered in the predetermined time or it fails to register the color number with the storage unit 15. Hereinafter, a color to be registered according to the color registration process will be referred to as a "registered color". In addition, a color registerable according to the color registration process will be referred to as a "color candidate".

The color determination processor 162 compares the color number output from the detector 11 with the "trigger" color number stored on the storage unit 15. The color determination processor 162 starts the color determination process when the comparison result indicates that the color representing the color number output from the detector 11 matches the trigger color. In the color determination process, the color determination processor 162 receives the color number from the detector 11 so as to compare the received color number with the color number representing the registered color stored on the storage unit 15. Then, the color determination processor 162 transmits a color change suspension instruction to the display device 20 by means of the transmitter 14 when the comparison results indicates that the color representing the received color number from the detector 11 matches the registered color.

In the comparison of the color determination process 162, the matching of colors does not necessarily indicates the matching of color numbers. For example, the color determination process 162 may determine the matching of colors when the colors representing the color numbers subjected to comparison fall within the predetermined range of values concerning hues, brightness, and chroma.

Next, the configuration of the position detection device 40 will be described.

The position detection device 40 includes a touch detector 41, a position coordinate calculation part 42, and a communication part 43 configured to communicate with the information processing device 30.

The touch detector 41 detects a touch on the touch panel 50. For example, the touch detector 41 may adopt touch detecting methods of a resistance film type, a surface capacitance type, a projection capacitance type, an ultrasonic surface-acoustic-wave type, an infrared optical imaging type, and an infrared-ray insulating type.

The position coordinate calculation part 42 calculates coordinates of a touched position detected by the touch detector 41. The position coordinate calculation part 42 transmits the positional information, representing the calculated coordinates of a touched position, to the information processing device 30 via the communication part 43. That is, the touch detector 41 and the position coordinate calculation part 42 are combined to form a position detector configured to detect the positional information representing an input position on the display 21.

Next, the configuration of the information processing device 30 will be described.

The information processing device 30 includes a communication part 31 configured to communicate with the position detection device 40, an image signal generator 32, and an image signal output part 33.

The image signal output part 33 acquires the positional information from the position detection device 40 via the communication part 31. Based on the acquired positional information, the image signal generator 32 generates an image signal representing an image corresponding to a hand-written input to the touch panel 50. The image signal output part 33 outputs an image signal to the display device 20.

Next, the configuration of the display device 20 will be described.

The display device 20 includes a display 2, an image signal input part 22, a receiver (i.e. a communication part of the display device) 23, a storage unit 24, and an image signal processor 25. For example, the image signal processor 25 can be realized using a microcontroller (not shown) installed in the display device 20.

The image signal input part 22 receives an image signal output from the information processing device 30 so as to send the image signal to the image signal processor 25.

The receiver 23 having a communication interface receives signals output from the input device 10.

For example, the storage unit 24 includes ROM, RAM, or the like. In addition, the storage unit 24 may include HDD (Hard Disk Drive), EEPROM, flash memory, or the like. The storage unit 24 stores various information used for the processing of a microcontroller and processing results.

The storage unit 24 stores image signals representing images in units of frames (hereinafter, referred to as "frame images") and image signals representing images accumulated in previous processing (hereinafter, referred to as "accumulated images").

The frame image represents an image being input in each frame, i.e. an image representing a difference than an image that has been input until a previous frame. In other words, the frame image represents an image of a region including different pixels in a display manner between two images corresponding to two frames within a time-series of images corresponding to frames.

Next, images stored on the storage unit 24 will be described with reference to FIG. 5.

Figure 5:
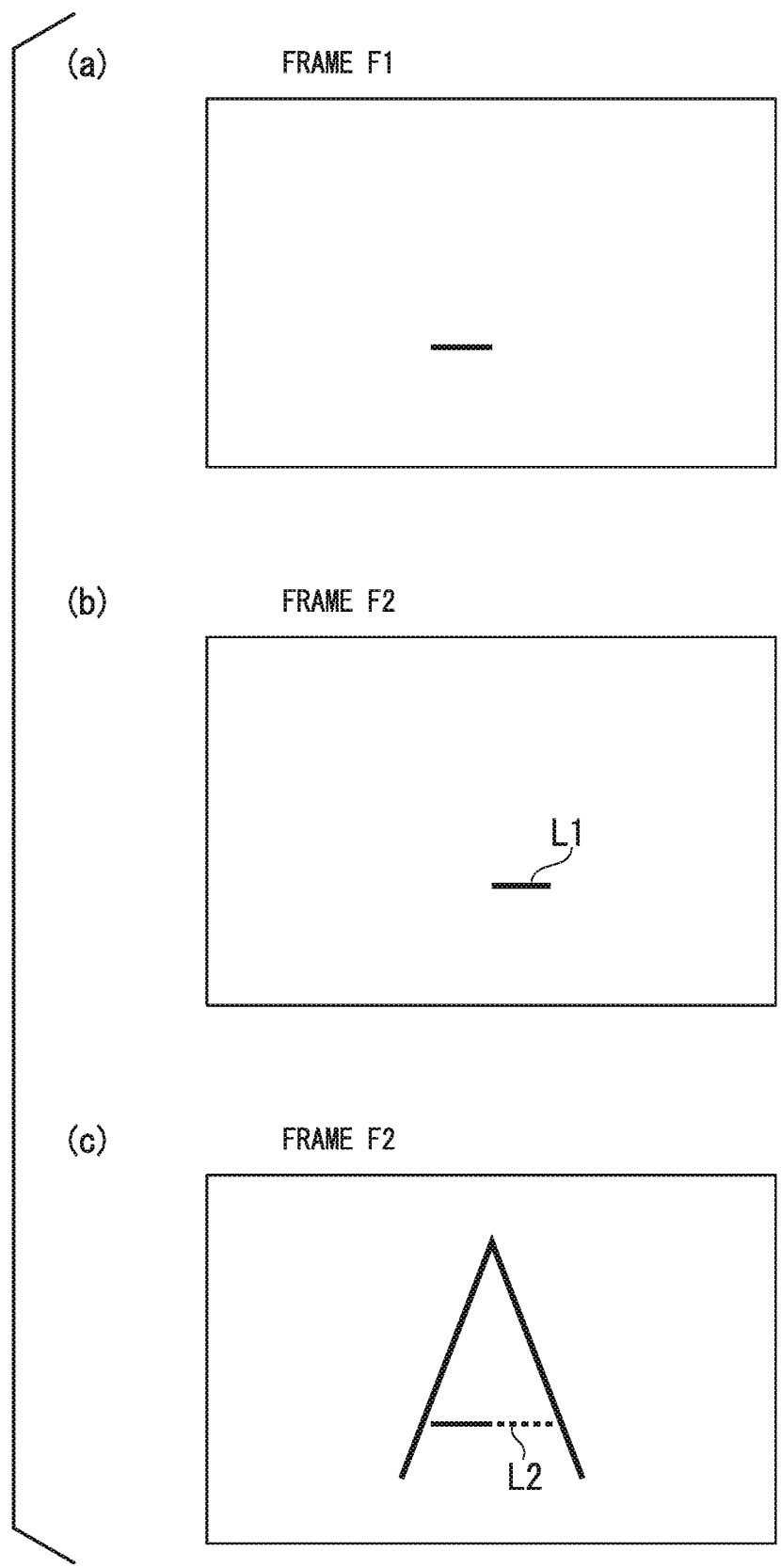
FIG. 5 show examples of images rendered by image signals stored in a display device according to the first embodiment of the present invention.

In FIG. 5, (a) through (c) show various types of images during a process of inputting a character "A".

FIG. 5(a) shows an example of a frame image in a frame F1.

FIG. 5(b) shows an example of a frame image in a frame F2 subsequent to the frame F1.

FIG. 5(c) shows an example of an "accumulated" image in the frame F2.

The color change process involves a change of colors in units of frames. A series of frame images having colors determined by the color change process are integrated into an accumulated image. Specifically, in the frame F2, for example, the color change process is applied to a line segment L shown in FIG. 5(b). In the next frame subsequent to the frame F2, a line segment L2 denoted using a dotted line in FIG. 5(c) is integrated into an image shown in FIG. 5(c) with the color determined by the color change process.

The configuration of the display device 20 will be described with reference to FIG. 4.

The image signal processor 25 receives an image signal output from the image signal input part 22 so as to generate image data corresponding to the image signal. The image signal processor 25 compares the generated image data with the image data representing an accumulated image store on the storage unit 24, and therefore the image signal processor 25 generates image data corresponding to a frame image representing a difference of two images representing two image data. The image signal processor 25 generates and stores the image data on the storage unit 24.

Without generating any frame image, the image signal processor 25 reads the image data representing an accumulated image from the storage unit 24 so as to generate an image signal corresponding to the read image data. The image signal processor 25 generates and outputs an image signal to the display 21, thus displaying an accumulated image on screen.

With generating frame images, the image signal processor 25 starts the color change process. First, the image signal processor 25 reads from the storage unit 24 image data representing an accumulated image and image data representing a frame image. Based on the image data of an accumulated image and the image data of a frame image, the image signal processor 25 generates an image signal representing an image having pixels, corresponding to the frame image, whose colors are changed in comparison with the accumulated image. The image signal processor 25 generates and displays the image signal with the display 21.

A specific example of the color change process with the image signal processor 25 will be described with reference to FIGS. 3 and 5. The specific example refers to the frame image shown in FIG. 5(b) and the accumulated image shown in FIG. 5(c), both of which are stored on the storage unit 24, wherein the color of a touched area will be changed in the order of colors shown in FIG. 3. In the color change process, the image signal processor 25 generates an image signal representing an image integrating an accumulated image depicted by a solid line and a frame image depicted by a dotted line L2 in FIG. 5(c). At this time, the image signal processor 25 sequentially generate image signals which are changed in color solely at pixels corresponding to the dotted line L2 in a touched area.

Specifically, the image signal processor 25 generates an image signal for setting the color of pixels, corresponding to the dotted line L2, to the trigger color, i.e. black, thus displaying its image with the display 21 for a predetermined time. Next, the image signal processor 25 generates an image signal for setting the color of pixels of the dotted line L2 to the trigger color, i.e. white, thus displaying its image with the display 21 for a predetermined time. Next, the image signal processor 25 generates an image signal for setting the color of pixels of the dotted line L2 to the color of the color marker M1, i.e. red, thus displaying its image with the display 21 for a predetermined time. Similarly, thereafter, the image signal processor 25 sequentially generates image signals for changing colors of pixels of the dotted line L2, thus displaying their images with the display 21 for a predetermined time. For example, the predetermined time is an adequate length of time that the input device 10 detects the color displayed on the display 21 so as to transmit a color determination signal based on the detected color to the display device 20 which in turn recognizes the color determination signal.

Upon receiving a color change suspension instruction form the input device 10 via the receiver 23 in the middle of the color change process or upon completing the color change process of sequentially changing colors, the image signal processor 25 generates image data corresponding to the currently outputted image signal. Then, the image signal processor 25 generates and stores the image data, as image data representing an accumulated image, on the storage unit 24. Thus, the image signal processor 25 is able to determine the color of a touched area according to the color change process.

Next, the operation of the display system 1 will be described with reference to FIGS. 6 to 9.

Figure 6:
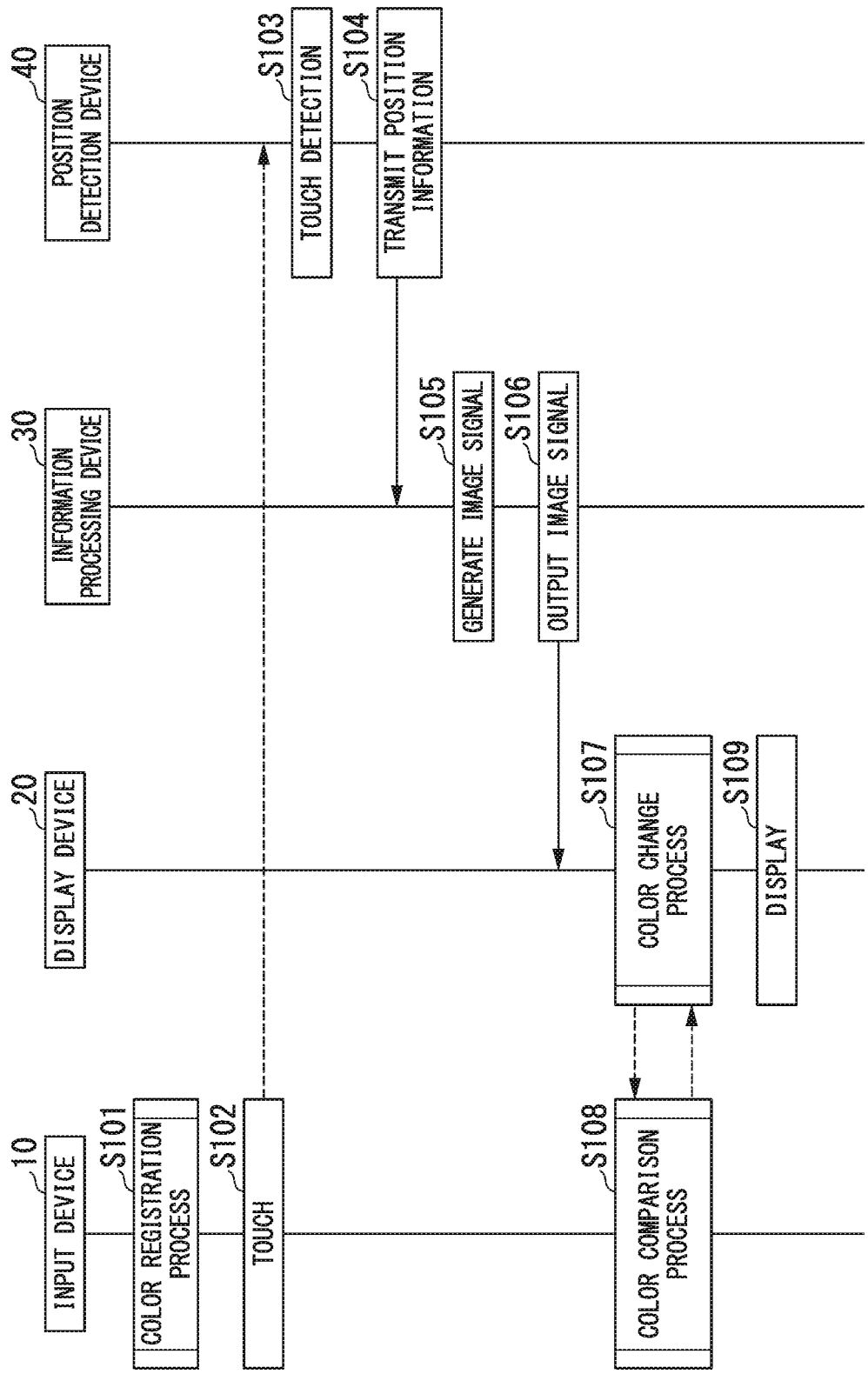
FIG. 6 is a sequence diagram showing an example of procedure for the display system according to the first embodiment of the present invention.

FIG. 6 is a sequence diagram showing an example of a procedure in the display system 1.

(Step S101) First, the input device 10 carries out a color registration process in response to a user's operation. Then, the display system 1 proceeds to the process of step S102.

(Step S102) Next, a user operates the input device 10 so as to touch the touch panel 50 with its pen point. Then, the display system 1 proceeds to the process of step S103.

(Step S103) Next, the position detection device 40 detects a touch on the touch panel 50 so as to generate the positional information representing a touched area. Then, the display system 1 proceeds to the process of step S104.

(Step S104) Next, the position detection device 40 generates and transmits the positional information to the information processing device 30. Then, the display system 1 proceeds to the process of step S105.

(Step S105) Next, the information processing device 30 generates an image signal based on the positional information transmitted from the position detection device 40. Then, the display system 1 proceeds to the process of step S106.

(Step S106) Next, the information processing device 30 generates and outputs the image signal to the display device 20. Then, the display system 1 proceeds to the process of step S107.

(Step S107) Next, the display device 20 acquires the image signal so as to compare an image representing the acquired image signal with the accumulated image. The display device 20 starts the color change process when the image representing the acquired image signal differs from the accumulated image. Then, the display system 1 proceeds to the process of step S108. Upon receiving a color change suspension instruction from the input device 10, the display device 20 determines the color of a touched area. Then, the display system 1 proceeds to the process of step S109. Alternatively, the display system 1 proceeds to the process of step S109 when the image representing the acquired image signal differs from the accumulated image.

(Step S108) Next, the input device 10 detects a trigger displayed with the display device 20 so as to start the color determination process. The input device 10 transmits a color change suspension instruction to the display device 20 according to the color determination process. Then, the display system 1 proceeds to the process of step S109.

(Step S109) Next, the display device 20 displays an image with the determined color. Then, the display system 1 exits the procedure of FIG. 6.

Figure 7:
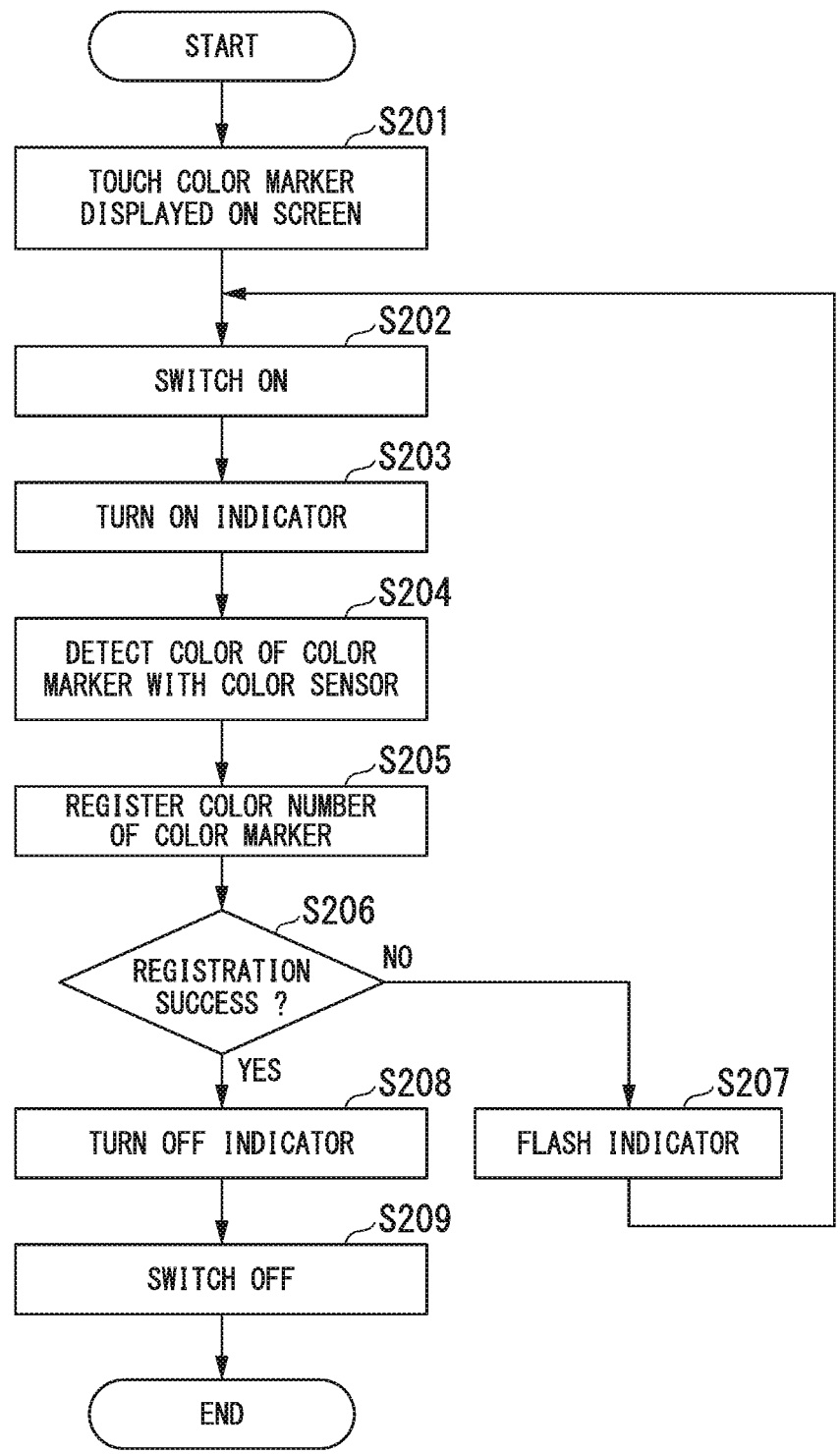
FIG. 7 is a flowchart showing an example of procedure for a color registration process by an input device according to the first embodiment of the present invention.

FIG. 7 is a flowchart showing an example of a procedure according to a color registration process with the input device 10.

(Step S201) First, a user operates the input device 10 so as to touch a color marker displayed on the screen of the touch panel 50 with the pen point corresponding to the distal end of the casing 101. Then, the input device 10 proceeds to the process of step S202.

(Step S202) Next, the registration processor 161 of the input device 10 accepts the user's pressing of the switch 12. Then, the registration processor 161 proceeds to the process of step S203.

(Step S203) Next, the registration processor 161 sends a lighting-up instruction to the indicator 13 so as to turn on the indicator 13. Then, the registration processor 161 proceeds to the process of step S204.

(Step S204) Next, the registration processor 161 acquires the color number assigned to the color marker detected by the detector 11. Then, the registration processor 161 proceeds to the process of step S205.

(Step S205) Next, the registration processor 161 acquires and stores the color number on the storage unit 24, thus achieving color registering. Then, the registration processor 161 proceeds to the process of step S206.

(Step S206) Next, the registration processor 161 determines whether or not the color registration is carried out successfully. When the registration processor 161 does not succeed in color registration, i.e. when the registration processor 161 fails to achieve the color registration (step S206; NO), the registration processor 161 proceeds to the process of step S207. In contrast, when the registration processor 161 succeeds in color registration (step S206; YES), the registration processor 161 proceeds to the process of step S208.

(Step S207) Next, the registration processor 161 sends a flashing instruction to the indicator 13 so as to flash the indicator 13. Then, the registration processor 161 returns to the process of step S202.

(Step S208) Next, the registration processor 161 sends a lighting-out instruction to the indicator 13. Then, the registration processor 161 proceeds to the process of step S209.

(Step S209) Next, the registration processor 161 turns off the switch 12. Then, the input device 10 exits the procedure of FIG. 7.

Figure 8:
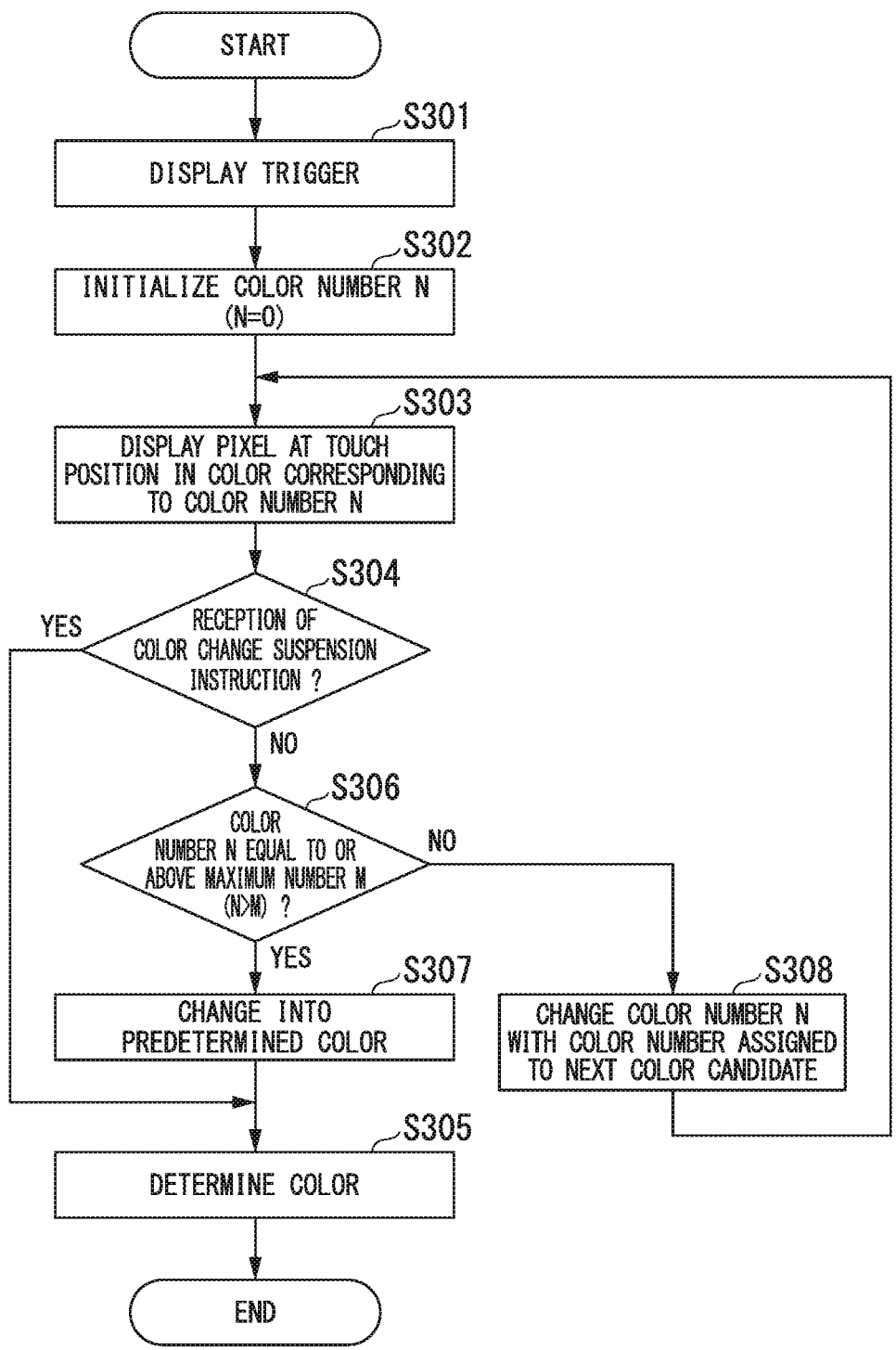
FIG. 8 is a flowchart showing an example of procedure for a color change process by the display device according to the first embodiment of the present invention.

FIG. 8 is a flowchart showing an example of a procedure according to the color change process with the display device 20.

(Step S301) First, the image signal processor 25 displays a touched area representing a frame image in a trigger color. Then, the image signal processor 25 proceeds to the process of step S302.

(Step S302) Next, the image signal processor 25 initializes the color number N, e.g. N=0, with the display 21. Then, the image signal processor 25 proceeds to the process of step S303.

(Step S303) Next, the image signal processor 25 changes the color of a touched area with the color representing the color number N so as to display the touched area for a predetermined time with the display 21. Then, the image signal processor 25 proceeds to the process of step S304.

(Step S304) Next, the image signal processor 25 determines whether or not it receives a color change suspension instruction from the input device 10. Upon receiving a color change suspension instruction (step S304; YES), the image signal processor 25 proceeds to the process of step S305. Without receiving a color change suspension instruction (step S304; NO), the image signal processor 25 proceeds to the process of step S306.

(Step S305) Next, the image signal processor 25 determines the color of a touched area as the color representing the color number N. Then, the image signal processor 25 exits the procedure shown in FIG. 8.

(Step S306) Next, the image signal processor 25 determines whether or not the color number N is equal to or above the maximum number M. When the color number N is equal to or above the maximum number M (step S306; YES), the image signal processor 35 proceeds to the process of step S307. When the color number N is less than the maximum number M (step S306; NO), the image signal processor 25 proceeds to the process of step S308.

(Step S307) Next, the image signal processor 25 changes the color number N with the predetermined color. That is, when the image signal processor 25 fails to receive a color change suspension instruction even though it completes sequentially changing colors according to the color change process once, the image signal processor 25 displays a touched area in a predetermined color, e.g. black. Thus, when a user applies a touch input using his/her finger, for example, the display device 20 is able to render the touched area in a predetermined color. Then, the image signal processor 25 proceeds to the process of step S305.

(Step S308) Next, the image signal processor 25 changes the color number N with another color number representing a next color candidate. Then, the image signal processor 25 returns to the process of step S303.

Figure 9:
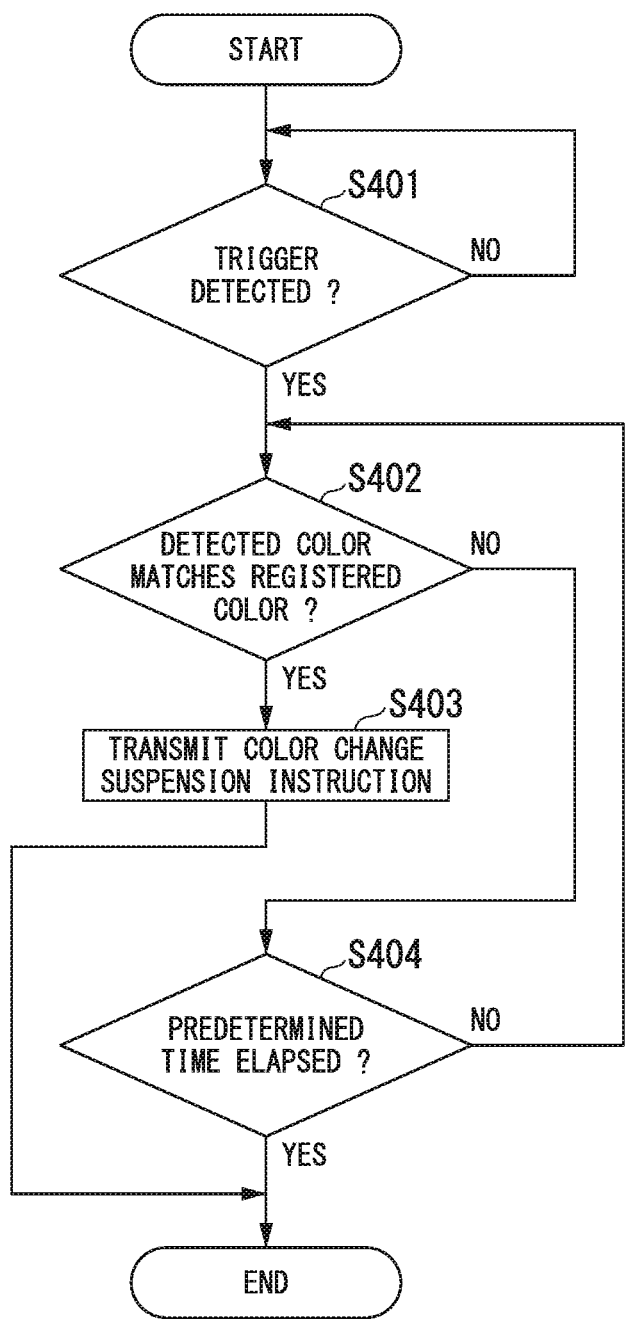
FIG. 9 is a flowchart showing an example of procedure for a color determination process by the input device according to the first embodiment of the present invention.

FIG. 9 is a flowchart showing an example of a procedure according to the color determination process with the input device 10.

(Step S401) First, the color determination processor 162 of the input device 10 determines whether or not the color detected by the detector 11 matches the trigger color. When the detected color matches the trigger color (step S401; YES), the color processor 162 proceeds to the process of step S402. When the detected color does not matches the trigger color (step S401; NO), the color determination processor 162 returns to the process of step S401.

(Step S402) Next, the color determination processor 162 compares the color number representing the detected color of the detector 11 with the color number representing the registered color stored on the storage unit 15, thus determining whether or not the detected color matches the registered color. When the detected color matches the registered color (step S402; YES), the color determination processor 162 proceeds to the process of step S403. When the detected color does not match the registered color (step S402; NO), the color determination processor 162 proceeds to the process of step S404.

(Step S403) Next, the color determination processor 162 transmits a color change suspension instruction to the display device 20 via the transmitter 14. Then, the color determination processor 162 exits the procedure shown in FIG. 9.

(Step S404) Next, the color determination processor 162 determines whether or not a predetermined time has been elapsed after detecting the trigger color in step S401. When a predetermined color has been elapsed (step S404; YES), the color determination processor 162 exits the procedure shown in FIG. 9. When a predetermined time has not be elapsed (step S404; NO), the color determination processor 162 returns to the process of step S402.

As described above, the display system 1 of the present embodiment includes the input device 10 and the display device 20. In addition, the display device 20 includes the image signal processor 25 that carries out the color change process of sequentially changing colors with respect to an image displayed on the display 21 based on a color determination signal received from the input device 10. Moreover, the input device 10 includes the color determination processor 162 that compares the color of an image displayed with the display device 20 with the color registered therein so as to transmit a color determination signal, based on the comparison result, to the display device 20 via the transmitter 14.

Thus, the display system 1 is able to render an image with a user's preferred color; hence, it is possible to improve the operability for a color input.

The display device 20 carries out the color change process after displaying a trigger. Upon detecting a trigger, the input device 10 carries out the color determination process.

Thus, the display device 20 is able to notify the input device 10 about the commencement of the color change process.

In this connection, the image signal processor 25 of the display device 20 may stores an image signal, representing an image being displayed when existing the procedure shown in FIG. 8, on non-volatile memory installed in the display device 20, or it may outputs an image signal to another device such as the information processing device 30.

The input device 10 includes the registration processor 161 configured to store the color information, detected by the detector 11, with the storage unit 15.

This allows a user to register an arbitrary color, displayable with the display device 20, in the input device 10; hence, a user is able to depict an image with an arbitrary color according to user's preference. Therefore, it is possible for the display device 1 to improve the operability for a color input.

The input device 10 includes the indicator 13 to notify start, completion, or failure to register a color in the input device 10.

This makes it possible for a user to recognize the progress of a color registration process. Therefore, it is possible for the display system 1 to improve the operability for a color input.

The input device 10 transmits a color determination signal as a color change suspension instruction to suspend the color change process with the display device 20.

Thus, the display system 1 is able to determine the displayed color for a touched area by transmitting a color change suspension instruction from the input device 10 once. That is, it is possible to reduce the amount of processing concerning communications, and therefore it is possible to reduce power consumption with the input device 10. Therefore, it is possible for the display system 1 to improve its operability.

Second Embodiment

Hereinafter, the second embodiment of the present invention will be described with reference to the drawings.

The same constituent elements as those of the foregoing embodiment will be denote using the same reference signs so as to adopt their descriptions here.

First, the outline of a display system 1a (FIG. 12) according to the second embodiment will be described with reference to FIGS. 10 and 11.

The display system 1a includes two input devices 10 (FIG. 12), replacing a single input device 10 of the display system 1 (FIG. 4), and a display device 20a (FIG. 12) replacing the display device 20 of the display system 1 (FIG. 4). The display system 1a including a plurality of input devices 10 is a display system that render images with colors designated by two input devices 10.

In this connection, the display system 1a may include two or more input devices 10. For the sake of simplifying descriptions, for example, the following description refers to an example of the display system 1a having two input devices 10.

Figure 10:
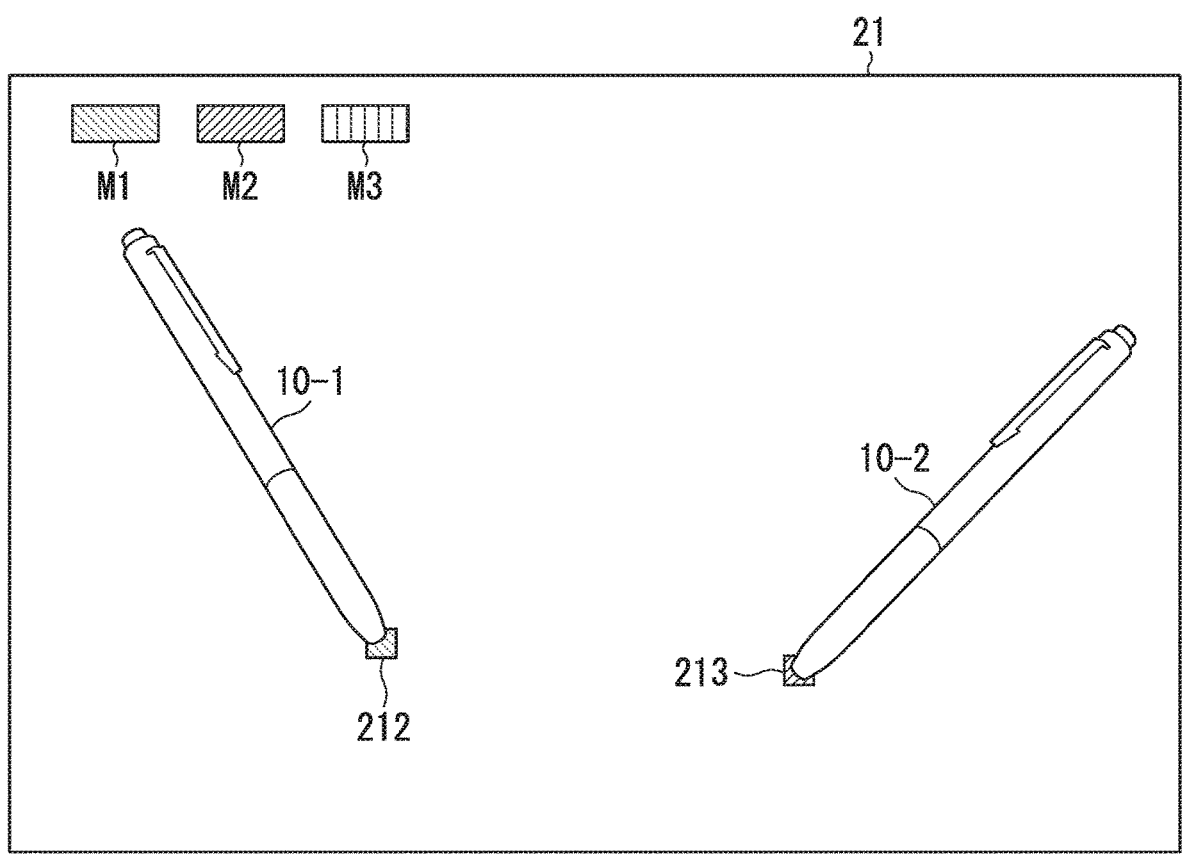
FIG. 10 is a drawing used to explain the outline operation of a display system according to the second embodiment of the present invention.

FIG. 10 is a drawing used to explain the outline of the display system 1a.

In an example of FIG. 10, similar to the foregoing example of FIG. 2, the touch panel 50 displays the color markers M1 through M3. In the example of FIG. 10, two input devices 10-1, 10-2 contact touched areas 212, 213 on the touch panel 50. The display device 20a carries out color change processes of sequentially changing displayed colors for two touch areas 212, 213. For example, the order of color change processes is determined based on coordinates of touched areas. The following description refers to an example of processing that the display device 20a compares coordinate values of pixels having minimum coordinate values in a vertical direction, among pixels having minimum coordinate values in a horizontal direction within pixels representing a plurality of touched areas designated by a plurality of input devices 10, with respect to the horizontal and vertical directions, so as to carry out color change processes in the ascending order of coordinate values. Specifically, in an example of FIG. 10 in which coordinate values are increased from the left to the right in a horizontal direction while coordinate values are increased from the upper to the lower in a vertical direction, the coordinate value of the touched area 212 in a horizontal direction is relatively larger than the coordinate value of the touched area 213 in a horizontal direction. Therefore, the display device 20a carries out a color change process on the touched area 213 subsequent to a color change process on the touched area 212.

Figure 11:
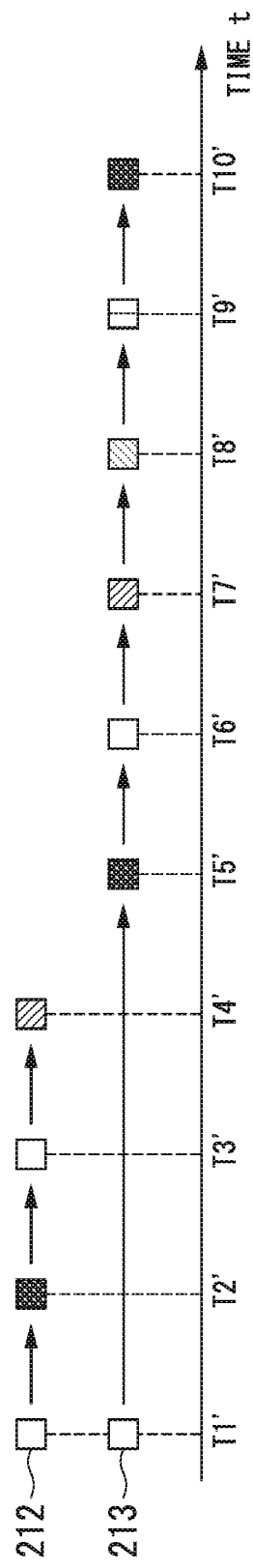
FIG. 11 is a drawing used to explain the outline of a color change process according to the second embodiment of the present invention.

FIG. 11 is a drawing used to explain the outline of color change processes.

FIG. 11 shows time-related changes of colors in the areas 212, 213 shown in FIG. 10.

In an example of FIG. 11, the horizontal axis represents time t indicating time transition from T1' to T10'. That is, the display device 20a sequentially changes colors applied to the touched areas 212, 213 according to colors assigned to times T1' to T10' in FIG. 11. Specifically, the display device 20a changes colors applied to the touched areas 212, 213 in the order of white, black, white, red, blue, green, and black, for example, unless it receives color change suspension instructions from the input devices 10-1, 10-2. As described above in conjunction with FIG. 10, the display device 20a carries out a color change process on the touched area 213 subsequent to a color change process on the touched area 212. A concrete example will be described with reference to FIG. 11. When the registered color of the input device 10-1 is red, for example, the display device 20a sequentially changes displayed colors on the touched area 212 so as to determine the displayed color on the touched area 212 according to a color change suspension instruction received from the input device 10-1 at time T4'. Next, the display device 20a start to change displayed colors on the touched area 213 at time T5', thus determining the displayed color on the touched area 213 according to a color change suspension instruction received from the input device 10-2. As described above, the display device 20a carries out color change processes on multiple touched areas in time shifts, and therefore it is possible to display touched areas designated by multiple input devices 10-1, 10-2 with their registered colors.

Next, the configurations of devices included in the display system 1a will be described with reference to FIG. 12.

Figure 12:
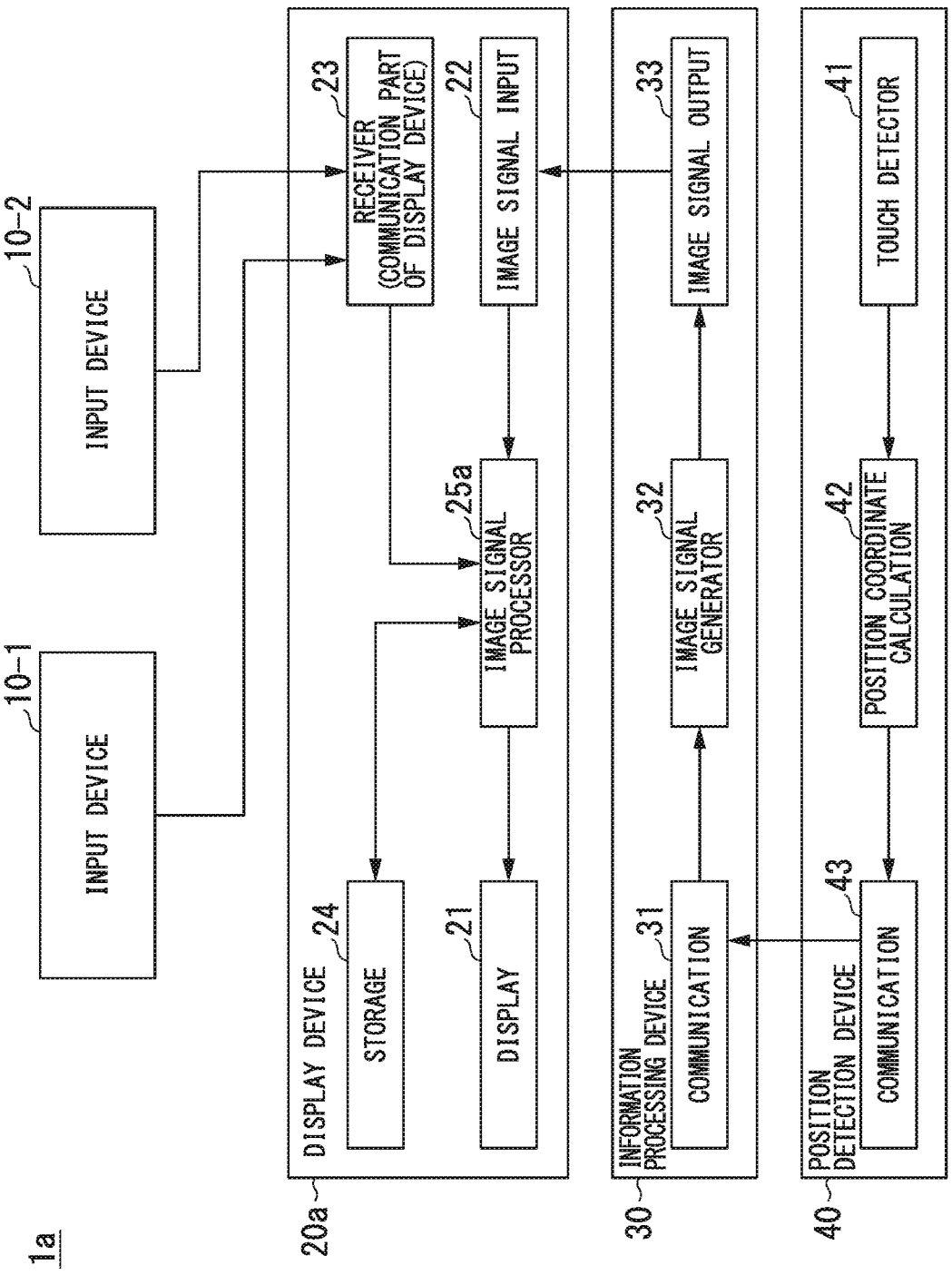
FIG. 12 is a block diagram showing the diagrammatical functional configuration of the display system according to the second embodiment of the present invention.

FIG. 12 is a block diagram diagrammatically showing the functional configurations with respect to the input devices 10-1, 10-2, the display device 20a, and their peripheral devices.

Both the input devices 10-1, 10-2 have the same configuration as the input device 10; hence, their descriptions will be omitted here. In addition, the information processing device 30 and the position detection device 40 have the same configurations as those of the foregoing embodiment; hence, their descriptions will be omitted here.

The display device 20a includes an image signal processor 25a (FIG. 12) replacing the image signal processor 25 (FIG. 4) of the display device 20 (FIG. 4).

The image signal processor 25a carries out a process of separating touched areas designated by contacts concurrently applied to the touch panel 50 in addition to the foregoing function of the image signal processor 25. In this process, the image signal processor 25a generates frame images as described in FIG. 5. Next, the image signal processor 25a separates input-detected areas in frame images based on the consecution of inputs. Specifically, the image signal processor 25a determines whether or not input pixels are consecutively positioned in a horizontal direction, a vertical direction, or a slanted direction. For example, the term "consecutively positioned" indicates that input pixels are positioned proximate to each other within a distance of few pixels in each direction. Thus, the image signal processor 25a specifies the separated areas in each frame image as the touched areas designated by touching using different input devices 10 or fingers.

The image signal processor 25a determines the order of carrying out color change processes with respect to the specified touched areas. As describe above, for example, the order of carrying out color change processes is determined based on the coordinate values of touched areas. The image signal processor 25a sequentially carries out color change processes on touched areas in the determined order.

Next, the operation of the display device 20a will be described with reference to FIG. 13.

Figure 13:
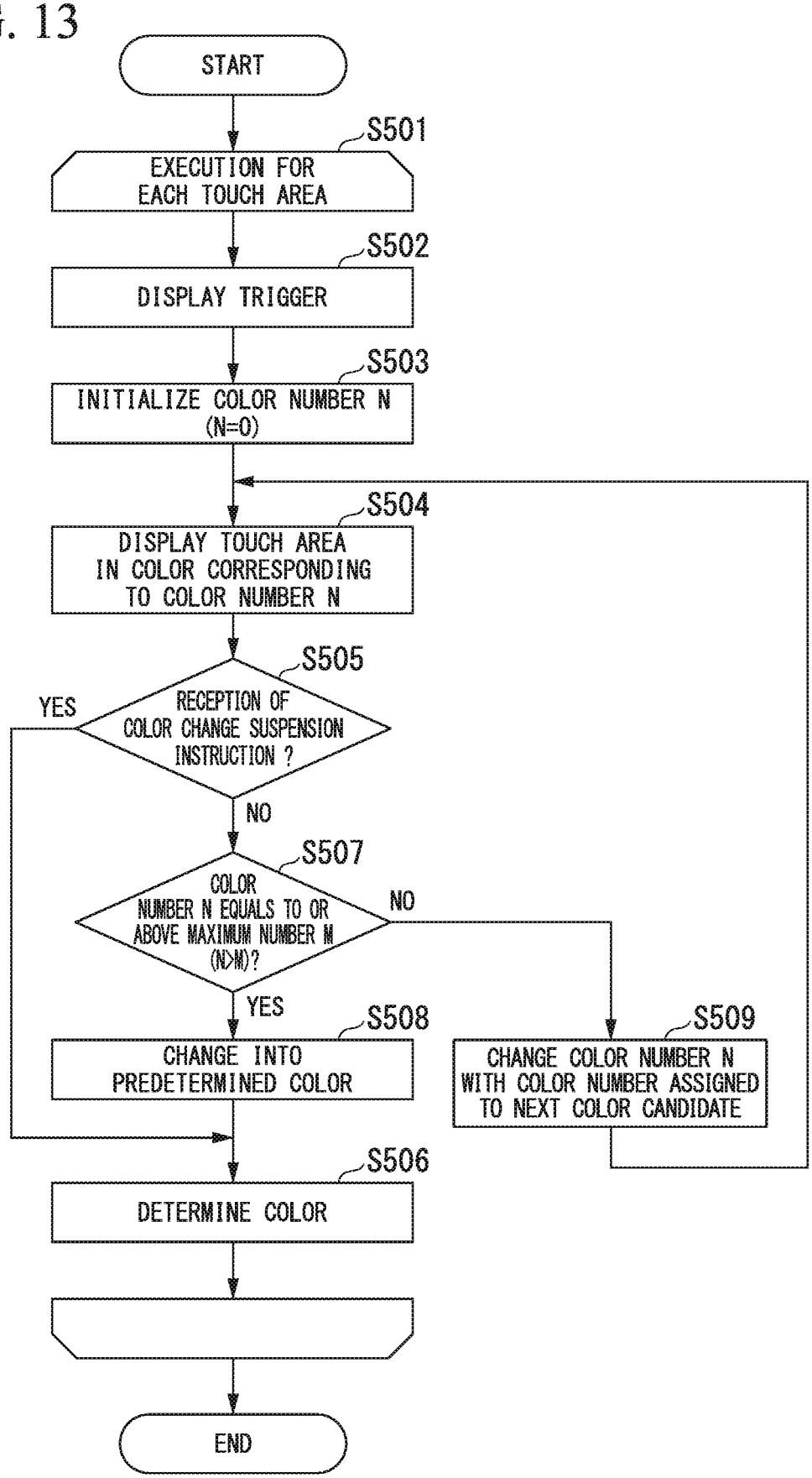
FIG. 13 is a flowchart showing an example of procedure for the color change process of a display device according to the second embodiment of the present invention.

FIG. 13 is a flowchart showing an example of a procedure according to the color change process of the display device 20a.

(Step S501) The image signal processor 25a (FIG. 12) carries out a series of steps S502 through S509 with respect to each of touched areas in each frame image. The image signal processor 25a repeatedly carries out a series of steps S502 through S509 until it has no touched area subject to processing. Then, the image signal processor 25a exits the procedure shown in FIG. 13. A series of steps S502 through S509 correspond to a series of steps S301 through S308 described in FIG. 8; hence, their descriptions will be omitted here.

As described above, in the display system 1a of the present embodiment, the image signal processor 25a of the display device 20a specifies a touched area, wherein it may specify a plurality of touched areas so as to carry out color change processes for those touched areas.

Thus, it is possible for the display system 1a to render images with the registered colors of the input devices 10 even when a plurality of input devices 10 are used to perform input operations on the touch panel 50. Therefore, it is possible for the display system 1a to improve the operability for a color input.

Figure 14:
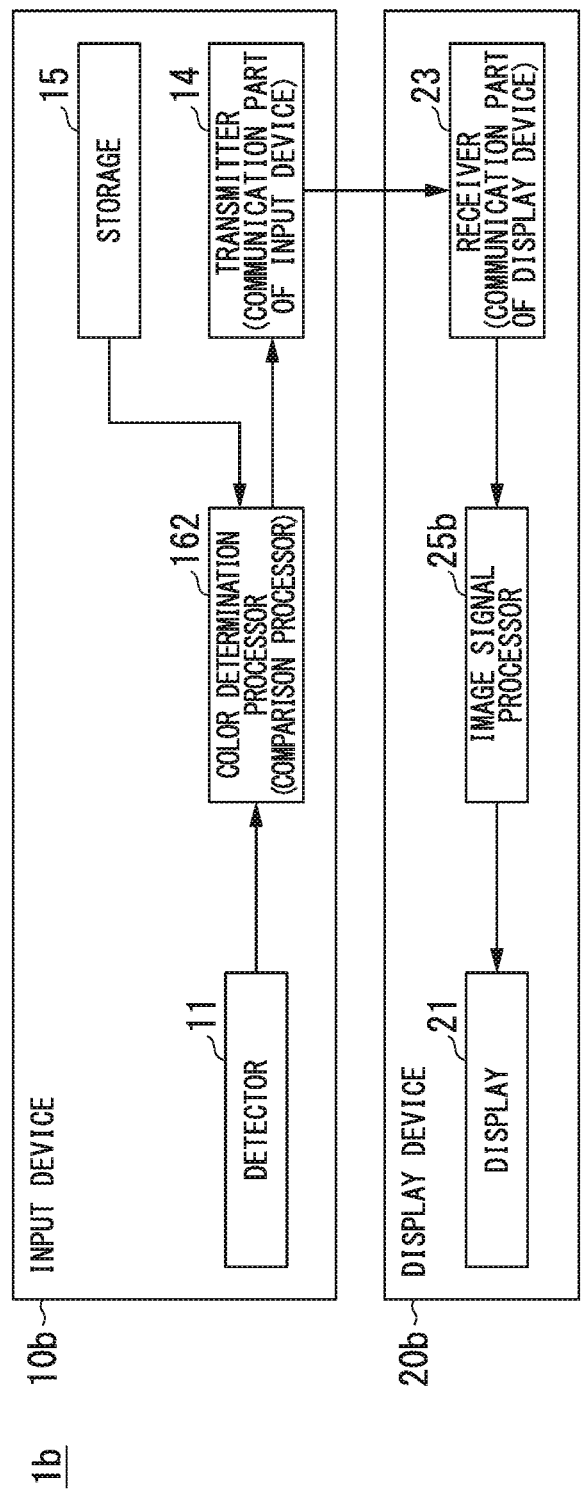
FIG. 14 is a block diagram showing the diagrammatical functional configuration of a display system according to a variation of the present invention.

Next, a display system according to a variation of the foregoing embodiments will be described with reference to FIG. 14.

A display system 1b according to a variation of the foregoing embodiments includes an input device 10b and a display device 20b.

The display device 20b includes a display 21, a receiver (i.e. a communication part of the display device) 23 configured to communicate with the input device 10b, and an image signal processor 25b.

The image signal processor 25b carries out a color change process of sequentially changing colors of an image displayed on the display 21 based on a color determination signal that the receiver 23 receives from the input device 10b.

The input device 10b includes a detector 11, a transmitter (i.e. a communication part of the input device) 14, a storage unit 15, and a color determination processor 162.

The detector 11 detects the color information concerning the color of an image displayed on the display 21 of the display device 20b.

The storage unit 15 stores the color information.

The color determination processor 162 compares the color information detected by the detector 11 with the color information stored on the storage unit 15.

The transmitter 14 transmits a color determination signal to the display device 20b based on the comparison result of the color determination processor 162.

Thus, it is possible for the display system 1b to render an image with a user's preferred color; hence, it is possible to improve the operability for a color input.

In the foregoing embodiments, for example, the display devices 20, 20a may refer to personal computers, mobile phones, tablets, smartphones, PHS (Personal Handy-phone System) terminal devices, PDA (Personal Digital Assistant), and electronic devices having touch panels such as game devices.

In the foregoing embodiments, the image signal processors 25, 25a of the display devices 20, 20a may change color numbers in a one-by-one manner in color change processes. Specifically, the image signal processor 25 may change the color by adding "1" to the color number N (where N=N+1) in step S308 of FIG. 8. At this time, for example, the input device 10 transmits a color change suspension instruction to the display device 20 when the detected color matches the color representing the color number registered in the input device 10. Thus, the display device 20 may assure that the displayed color of a touched area will reliably match the registered color of the input device 10; hence, it is possible to accurately reproduce a user's preferred color.

In this connection, a user may arbitrarily determine the order of displaying colors according to the color change process. In the color change process, for example, the display devices 20, 20a, 20b may change colors in the descending order of color numbers.

In the foregoing embodiments, the information processing device 30 may transmit to the display devices 20, 20a image data instead of image signals. In addition, the information processing device 30 may share part of the functions involved in the image signal processors 25, 25a. For example, the information processing device 30 may generate image data for each frame image so as to transmit it to the display device 20. In this case, the display device 20 carries out a color change process based on image data for each frame image received from the information processing device 30. For example, the information processing device 30 may specify a plurality of touched areas on each frame image so as to transmit the information, representing the range of specified touched areas, to the display device 20. In this case, the display device 20 carries out a color change process with respect to each specified touched area based on the information, representing the range of each touched area, received from the information processing device 30.

In the foregoing embodiments, the input device 10 may register a plurality of colors. In this case, for example, the input device 10 has buttons allowing each user to select each of registered colors, and therefore the input device 10 carries out a color determination process based on the registered color selected by user's pressing each button. This eliminates the necessity that a user may operate the input device 10 to carry out a color registration process every time the registered color is changed; hence, it is possible for the display system 1a to improve the operability for a color input.

The color numbers representing the registered colors can be stored on the storage unit 15, installed in each of the input devices 10, 10b, in advance. In this case, the input devices 10, 10b carry out color determination processes based on the color numbers representing the registered colors that are registered in advance.

In the foregoing embodiments, part of the input devices 10, 10b, part of the display devices 20, 20a, 20b, part of the information processing device 30, part of the position detection device 40, e.g. the registration processor 161, the color determination processor 162, the image signal processors 25, 25a, 25b, the image signal generator 32, and the position coordinate calculation part 42, can be realized using computers. In this case, programs realizing the above functions are stored on computer-readable storage media; programs stored on storage media are loaded to and executed by computer systems so as to achieve the above functions. Herein, the term "computer systems" may refer to computer systems installed in the input device 10, the display devices 20, 20a, the information processing device 30, and the position detection device 40, and therefore they may include OS (Operating System) and hardware such as peripheral devices.

The term "computer-readable storage media" may refer to flexible disks, magneto-optic disks, ROM, portable media such as CD-ROM, and storage units such as hard disks installed in computer system. In addition, the term "computer-readable storage media" may refer to any measures for dynamically holding programs for a short period of time such as networks, e.g. the Internet, and communication lines, e.g. telephone lines, used for transmitting programs as well as any measures for holding programs for a certain period of time such as volatile memory installed in computer systems serving as servers or clients. The foregoing programs may achieve part of the foregoing functions, or the foregoing programs may be combined with other programs pre-installed on computer systems so as to achieve the foregoing functions.

Part of or the entirety of the input device 10, the display devices 20, 20a, the information processing device 30, and the position detection device 40 may be realized using integrated circuits such as LSI (Large Scale Integration). Each of functional parts embedded in the input device 10, the display devices 20, 20a, the information processing device 30, and the position detection device 40 can be individually realized using processors. Alternatively, part of or the entirety of functional parts can be integrated using processors. The method of designing integrated circuits is not necessarily limited to LSI; hence, it is possible to adopt purpose-specified circuits or general-use processors. If other technologies for designing integrated circuits replacing LSI would be developed due to the advancement of semiconductor technologies, those technologies can be used to design integrated circuits.

Heretofore, the foregoing embodiment of the invention have been described in detail with reference to the drawings, however, specific configurations are not necessarily limited to the foregoing configurations; hence, it is possible to introduce various design changes without departing from the subject matter of the invention.

(Supplementary Note 1)

A display device includes a display configured to display an image, an image signal processor configured to display the image on the display, and a receiver configured to receive a signal from an input device, wherein the image signal processor carries out a color change process of sequentially changing colors at a partial area of the display, but the image signal processor suspends the color change process when the receiver receives a signal indicating suspension of the color change process from the input device.

(Supplementary Note 2)

In the display device as defined in supplementary note 1, the partial area includes an area corresponding to an input position representing positional information detected by a position detector.

(Supplementary Note 3)

An input device includes a detector that detects a target color representing a color at a partial area of a display installed in a display device so as to acquire target color information representing color information of the target color, a storage unit configured to store registered color information, a color determination processor that carries out a color determination process to determine whether or not the target color information matches the registered color information so as to generate a color determination signal when the target color information matches the registered color information, and a transmitter configured to transmit the color determination signal to the display device.

(Supplementary Note 4)

In the input device as defined in supplementary note 3, the partial area include an area corresponding to an input position representing positional information detected by a position detector.

REFERENCE SIGNS LIST 1, 1a, 1b display system
10, 10-1, 10-2, 10b input device
101 casing
39
102 hole
11 detector
12 switch
13 indicator
14 transmitter (communication part of input device)
15 storage unit
161 registration processor
162 color determination processor
20, 20a, 20b display device
21 display
22 image signal input part
23 receiver (communication part of display device)
24 storage unit
25, 25a, 25b image signal processor
30 information processing device
31 communication part
32 image signal generator
33 image signal output part
40 position detection device
41 touch detector
42 position coordinate calculation part
43 communication part
50 touch panel
211 through 213 touched area
M1 through M3 color marker
T1 through T7, T1' through T10' time

The invention claimed is:

1. A display system comprising a display device and an input device configured to communicate with the display device, wherein the display device includes a display configured to draw an image using the input device having a casing, and an image signal processor configured to display the image on the display,
wherein the casing of the input device includes a detector configured to acquire target color information representing a target color at a touched area touched by the input device on the display,
a storage unit configured to store registered color information representing a predetermined color, and
a color determination processor configured to carry out a color determination process to generate a color determination signal when the target color information matches the registered color information,
wherein the image signal processor carries out a color change process to change the target color in a predetermined order of colors as long as the input device touches the touched area on the display, and wherein the image signal processor suspends the color change process upon receiving the color determination signal from the input device.

2. The display system according to claim 1, further comprising a position detection device coupled with the display device, which is configured to detect positional information representing an input position of the input device touched on the display.

3. The display system according to claim 2, further comprising an information processing device coupled with the display device, which is configured to generate an image signal based on the positional information from the position detection device, thus sending the image signal to the display device.

4. The display system according to claim 1, wherein the image signal processor carries out the color change process after displaying the target color, and
wherein the storage unit of the input device stores trigger color information representing a trigger color such that the color determination processor starts the color determination process when the target color information matches the trigger color information.

5. The display system according to claim 1, wherein the image displayed on the display comprises a time series of images correlated to frames, and wherein the touched area includes an area having pixels displayed in a different manner among pixels of the image between two images corresponding to two frames.

6. The display system according to claim 1, wherein the input device carries out a registration process to store the registered color information on the storage unit.

7. The display system according to claim 6, wherein the input device is further configured to notify completion of the registration process of the registered color information on the storage unit.

8. The display system according to claim 1, wherein the image signal processor stores color-changed image information, representing an image displayed on the display when suspending the color change process, on non-volatile memory or outputs the color-changed image information to another device.

9. A display device connectible to an input device, comprising:
a display configured to draw an image using the input device having a casing; and
an image signal processor configured to display the image on the display;
wherein the image signal processor carries out a color change process to change a target color at a touched area touched by the input device on the display, and
wherein the image signal processor suspends the color change process upon receiving a color determination signal, which is generated by the input device when the target color at the touched area matches a registered color which is determined in advance.

10. An input device connectible to a display device configured to draw an image using the input device having a casing, comprising:
a detector configured to acquire target color information representing a target color at a touched area touched by the input device on a display of the display device;
a storage unit configured to store registered color information representing a predetermined color; and
a color determination processor configured to carry out a color determination process to generate a color determination signal when the target color information matches the registered color information, thus sending the color determination signal to the display device,
wherein the detector, the storage unit and the color determination processor are included in the casing.

11. A display method adapted to a display system including an input device and a display device configured to draw an image using the input device having a casing, the display method comprising:
- a first step for the display device to carry out a color change process to change a target color at a touched area touched by the input device on a display of the display;
- a second step for the input device to acquire target color information representing the target color;
- a third step for the input device to carry out a color determination process to generate a color determination signal when the target color information matches registered color information representing a predetermined color;
- a fourth step for the input device to transmit the color determination signal to the display device;
- a fifth step for the display device to suspend the color change process when receiving the color determination signal from the input device; and
- a sixth step for the display device to display on the display an image having the target color when suspending the color change process in the fifth step.

12. The display device according to claim 9, wherein the display has a touch panel responsive to a touch made by the input device.

13. The display device according to claim 9, wherein the image signal processor carries out the color change process at the touched area on the display, which includes a touched point touched by the input device and its peripheral area, or the position of the image drawn by the input device before defining its color.

14. The input device according to claim 10, wherein the detector is a color sensor configured to detect the target color upon detecting a light beam emitted from the touched area of the display.

* * * * *